(12) United States Patent
Ryder et al.

(10) Patent No.: US 12,075,720 B2
(45) Date of Patent: Sep. 3, 2024

(54) SYSTEM AND METHOD FOR OPERATING A MATERIAL METERING SYSTEM OF AN AGRICULTURAL IMPLEMENT

(71) Applicant: CNH Industrial Canada, Ltd., Saskatoon (CA)

(72) Inventors: Nicholas George Alfred Ryder, Saskatoon (CA); Matthew Stuart Naylor, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 850 days.

(21) Appl. No.: 17/168,384

(22) Filed: Feb. 5, 2021

(65) Prior Publication Data
US 2022/0248593 A1    Aug. 11, 2022

(51) Int. Cl.
*A01C 7/08* (2006.01)
*A01C 15/00* (2006.01)
*G01N 9/02* (2006.01)

(52) U.S. Cl.
CPC ............ *A01C 7/082* (2013.01); *A01C 15/005* (2013.01); *G01N 9/02* (2013.01); *G01N 2009/024* (2013.01)

(58) Field of Classification Search
CPC ....... A01C 7/082; A01C 15/005; A01C 7/081; A01C 7/08; A01C 7/00; A01C 15/00; G01N 9/02; G01N 2009/024; G01N 9/00; G01N 2009/022
See application file for complete search history.

(56) References Cited

U.S. PATENT DOCUMENTS

| | | | |
|---|---|---|---|
| 5,423,455 | A | 6/1995 | Ricciardi et al. |
| 5,957,773 | A | 9/1999 | Olmsted et al. |
| 6,584,920 | B1 | 7/2003 | Cresswell |
| 6,986,294 | B2 | 1/2006 | Fromme et al. |
| 8,032,255 | B2 | 10/2011 | Phelan et al. |
| 8,695,396 | B2 | 4/2014 | Landphair et al. |
| 2002/0014116 | A1 | 2/2002 | Campbell et al. |

(Continued)

FOREIGN PATENT DOCUMENTS

| | | |
|---|---|---|
| CN | 102967260 | 3/2013 |
| CN | 103063136 | 4/2013 |

(Continued)

OTHER PUBLICATIONS

"Air Drill Cart," ADC2350 ADC2350B, Aircart Maintenance, Great Plains, Oct. 2008, 5 pgs., Retrieved on Jul. 2, 2019 from: https://www.greatplainsag.com/manuals/pdf/field_guides/FieldAdj-ADC2350_10-08.pdf.

(Continued)

*Primary Examiner* — Christopher J. Novosad
(74) *Attorney, Agent, or Firm* — Rebecca Henkel; Peter Kraft Zacharias; Rickard K. DeMille (57) ABSTRACT

A method for controlling a material flow rate from a metering system of an agricultural system includes receiving at a controller, a weight of a material in a storage tank. The method also includes receiving, at the controller, a volume of the material in the storage tank. The method also includes determining, via the controller, a density of the material in the storage tank using the weight of the material in the storage tank and the volume of the material in the storage tank. The method further includes determining, via the controller, a calibration of the metering system based on the density of the material in the storage tank.

20 Claims, 4 Drawing Sheets

(56) References Cited

U.S. PATENT DOCUMENTS

| | | |
|---|---|---|
| 2014/0076047 A1 | 3/2014 | Liu |
| 2016/0061643 A1 | 3/2016 | Wilson et al. |
| 2018/0035603 A1 | 2/2018 | Kremmer et al. |

FOREIGN PATENT DOCUMENTS

| | | | | |
|---|---|---|---|---|
| CN | 104776896 A | * | 7/2015 | ............. G01F 25/00 |
| CN | 115868665 A | * | 3/2023 | ............... A24C 5/34 |

OTHER PUBLICATIONS

"Description of Instrument Functions Tank Side Monitor NRF590 Inventory Control Software Version 02.04.zz," 2 Endress + Hauser, 2013, 112 pgs, Retrieved on Jul. 2, 2019 from: https://portal.endress.com/wa001/dla/5000557/6508/000/06/BA00257FEN_1313.pdf.

* cited by examiner

SYSTEM AND METHOD FOR OPERATING A MATERIAL METERING SYSTEM OF AN AGRICULTURAL IMPLEMENT

BACKGROUND

The present disclosure relates generally to a system and method for operating a material metering system of an agricultural implement.

Generally, a seeding implement (e.g., seeder) is towed behind a tractor or other work vehicle via a mounting bracket secured to a rigid frame of the seeding implement. The seeding implement typically includes multiple row units distributed across a width of the seeding implement. Each row unit is configured to deposit seeds at a desired depth beneath a soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural material (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver the agricultural material (e.g., seeds, fertilizer) to the row units of the seeding implement. The air cart generally includes a storage tank (e.g., a pressurized tank), an air source (e.g., a blower), and a metering system. The agricultural material is typically gravity fed from the storage tank to the metering system, which distributes a volume of the agricultural material into an air stream generated by the air source. The air stream carries the agricultural material to the row units via conduits extending between the air cart and the seeding implement. The metering system typically includes a metering assembly that regulate the flow of the agricultural material (e.g. meter rollers that regulate the flow of the agricultural material based on meter roller geometry and rotation rate). There may be a target amount of material distribution over a given area of the field, which may depend, at least in part, on an operator's desired application rate. To provide the target amount of material distribution over the given area of the field, the metering system may be calibrated (e.g., to quantify an amount of agricultural material dispensed per number of rotations) prior to starting seeding operations. However, the calibration may involve time-consuming steps and/or may not be accurate, which may result in potentially reduced yields and/or less than optimal application rates.

SUMMARY

In one embodiment, a method for controlling a material flow rate from a metering system of an agricultural system includes receiving, at a controller, a weight of a material in a storage tank. The method also includes receiving, at the controller, a volume of the material in the storage tank. The method also includes determining, via the controller, a density of the material in the storage tank using the weight of the material in the storage tank and the volume of the material in the storage tank. The method further includes determining, via the controller, a calibration of the metering system based on the density of the material in the storage tank.

In one embodiment, a controller having a memory and a processor is configured to access a weight of a material in a storage tank, access a volume of the material in the storage tank, and determine a density of the material in the storage tank using the weight of the material in the storage tank and the volume of the material in the storage tank. The controller is also configured to control a fan speed of an air source based on the density of the material in the storage tank to provide an air flow to transfer the material dispensed from a metering system through a conduit to a seeding implement of an agricultural system.

In one embodiment, an agricultural system includes a storage tank configured to store a material and a metering system configured to meter the material from the storage tank. The agricultural system also includes a controller having a memory and a processor, and the controller is configured to determine a density of the material in the storage tank using a weight of the material in the storage tank and a volume of the material in the storage tank. The controller is also configured to determine a calibration of the metering system based on the density of the material in the storage tank.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
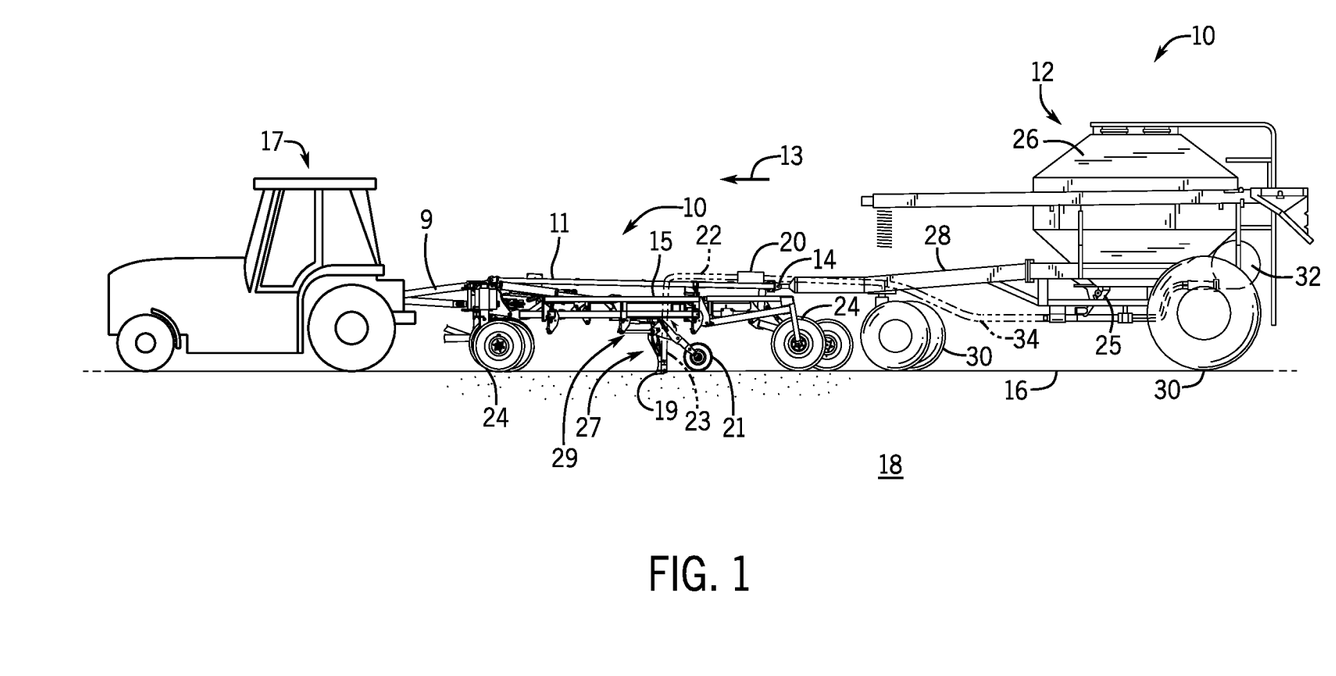
FIG. 1 is a side view of an embodiment of a seeding system having a tractor, anair cart, and a seeder

Turning now to the drawings, FIG. 1 is a side view of an embodiment of an agricultural material application system 10 (e.g., a seeding system or a planter system). The agricultural material application system 10 includes an agricultural implement 11 (e.g., seeding implement or seeder) coupled to an air cart 12. In the illustrated embodiment, the air cart 12 is towed behind the agricultural implement 11, relative to a direction of travel 13. In addition, the agricultural implement 11 is coupled to a work vehicle 17 by a first hitch system 9, and the air cart 12 is coupled to the agricultural implement 11 by a second hitch system 14. While the agricultural implement 11 is towed between the work vehicle 17 and the air cart 12 in the illustrated embodiment, it should be appreciated that the agricultural implement may be towed behind the air cart. Furthermore, it should be appreciated that the implement and the air cart may be part of a single unit that is towed behind the work vehicle, or the agricultural implement and the air cart may be elements of a self-propelled vehicle.

The agricultural implement 11 may deposit rows of seeds into the soil as the agricultural implement 11 is towed across a surface 16 of an agricultural field 18 by the work vehicle 17. The agricultural implement 11 includes a tool frame 15 coupled to a row unit 27 (e.g., a ground engaging opener system), a distribution header 20, a hose 22, and wheel assemblies 24. The wheel assemblies 24 may contact the surface 16 to enable the agricultural implement 11 to be towed by the work vehicle 17. As the agricultural implement 11 moves in the direction of travel 13, a row of seeds may be deposited into the soil by the row unit 27. Although only one row unit 27 is shown, the agricultural implement 11 may include multiple row units 27 organized in one or more rows across a width of the agricultural implement 11.

In the illustrated embodiment, the agricultural implement 11 is a precision drill, and operation of the precision drill is generally described herein to facilitate discussion and understanding of various features and operations of the agricultural material application system 10. However, it should be understood that the agricultural implement 11 may be any of a variety of seeding implements or other types of agricultural implements. With the forgoing in mind and with reference to FIG. 1, in the illustrated embodiment, each row unit 27 includes an opener 19, a press wheel 21, a seed tube 23, and a hydraulic cylinder 29. When the opener 19 engages the soil, the opener 19 may exert a force that excavates a trench into the soil as the row unit 27 travels through the agricultural field 18. A position of the press wheel 21 controls the depth of the opener 19, and the hydraulic cylinder 29 controls the downward force (e.g., a down pressure). For example, the opener 19 may be controlled to establish a target depth of the trench. Seeds may then be deposited into the excavated trench via the seed tube 23. Then, the press wheel 21 may facilitate movement of the excavated soil into the trench to cover the seeds and compress the soil covering the seeds.

Regardless of a type of the agricultural implement 11, the air cart 12 may centrally store seeds and distribute the seeds to the row unit 27. Accordingly, the air cart 12 includes an agricultural material meter 25, a storage tank 26, a frame 28, wheels 30, and an air source 32. In the depicted embodiment, the frame 28 is coupled to the tool frame 15 via the hitch 14. The wheels 30 may contact the surface 16 to enable the air cart 12 to be towed along with the agricultural implement 11. Additionally, the storage tank 26 may centrally store the seeds for distribution. In some embodiments, the storage tank 26 may include multiple compartments for storing different types of granular materials. For example, a first compartment may store the seeds while a second compartment may store a dry fertilizer. In such configurations, the air cart 12 may deliver both seed and fertilizer to the agricultural implement 11 via separate distribution systems, or as a mixture through a single distribution system.

Generally, the distribution system may control an amount of seeds distributed to the agricultural field 18 using the agricultural material meter 25. For example, the agricultural material meter 25 may be controlled to increase or decrease the amount of seeds distributed to the agricultural field 18. As depicted, the agricultural material meter 25 is mounted to the bottom of the storage tank 26, which may enable the storage tank 26 to supply seeds to the agricultural material meter 25. The agricultural material meter 25 may then distribute the seeds to the distribution header 20 via a respective hose 34. The distribution headers 20 may then distribute the seeds to one or more row units 27 via the hose 22. In this manner, the agricultural material meter 25 may control distribution of seeds from the storage tank 26 to the row units 27 and into the trenches.

Before the agricultural implement 11 passes through the agricultural field 18, the agricultural material meter 25 is calibrated (e.g., an initial calibration) by determining a weight of seeds distributed per revolution(s) of the agricultural material meter 25. Then, a controller may use the calibration to control the agricultural material meter 25 to meter the seeds to achieve a particular target application rate (e.g., weight per unit of land area, such as pounds [lbs] per acre), which may be set by an operator. To facilitate the calibration, the controller may be configured to determine a density of the seeds in the storage tank 26 of the air cart 12, and the controller may then use the density to determine the weight of seeds distributed per revolution(s) of the agricultural material meter 25. Furthermore, as discussed in more detail below, the controller may use the density and/or the calibration to determine one or more parameters (e.g., fan speed) for the air source 32.

Figure 2:
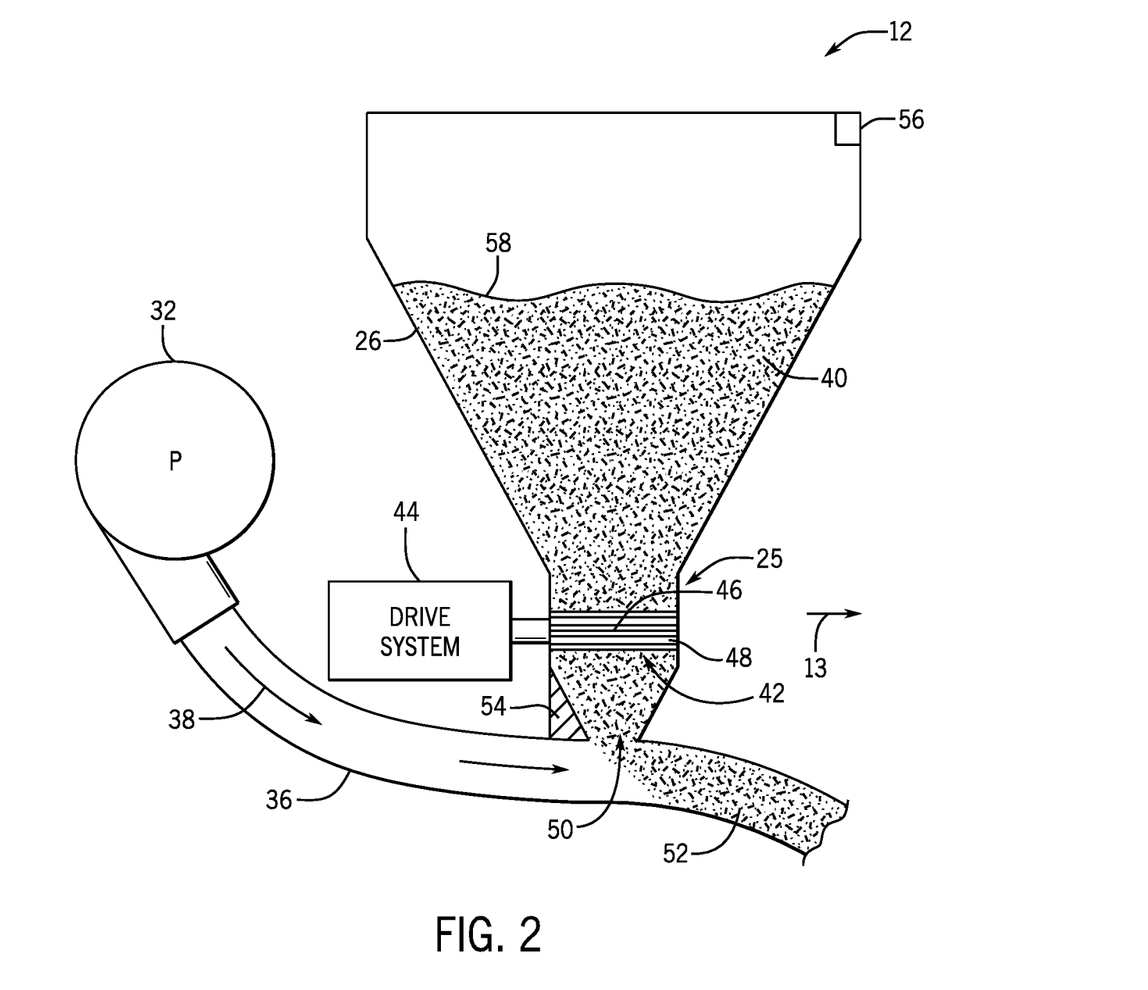
FIG. 2 is a schematic view of an embodiment of a metering system that may be employed within the air cart of FIG. 1.

FIG. 2 is a schematic view of an embodiment of the agricultural material meter 25, the storage tank 26, the air source 32, and other components of the air cart 12. As illustrated, the air source 32 is coupled to a conduit 36 (e.g., hose) configured to provide an air stream 38 that flows past the agricultural material meter 25. The air source 32 may be a pump or blower powered by an electric or hydraulic motor, for example. In operation, flowable particulate material 40 (e.g., seeds, fertilizer) within the storage tank 26 flows by gravity into the agricultural material meter 25. In certain embodiments, the storage tank 26 is pressurized such that a static pressure in the storage tank 26 is greater than a static pressure in the conduit 36, thereby facilitating an even flow of the material 40 through the agricultural material meter 25. In the illustrated embodiment, the agricultural material meter 25 includes one or more meter rollers 42 (e.g., rotatable metering devices) configured to regulate the flow of material 40 into the air stream 38. For example, certain agricultural material meters 25 may include twelve meter rollers 42, each may be disposed within an independent housing and each configured to flow the material 40 into a respective conduit 36 for distribution to one or more respective row units of the agricultural implement. Such metering systems are known as "12-run" metering systems. However, in alternative embodiments, the agricultural material meter 25 may include more or fewer meter rollers (e.g., 1, 2, 3, 4, 5, 6, 7, 8, 9, 10, 11, 13, or more). In alternative embodiments, the agricultural material meter 25 may include another type of metering assembly or device, such as an auger or similar device, that is configured to regulate the flow of material 40 into the air stream 38. It should be appreciated that the techniques disclosed herein may be utilized within any of a variety of different types of metering assemblies or devices.

In the illustrated embodiment, the meter roller 42 is coupled to a drive system 44 (e.g., motor) configured to drive the meter roller 42 to rotate. In certain embodiments, the drive system 44 may include a drive unit, such as an electric or hydraulic motor, configured to drive one or more meter rollers to rotate. In further embodiments, the drive system 44 may be coupled to a wheel (e.g., via a gear system) such that rotation of the wheel drives the meter roller 42 to rotate. Such a configuration automatically varies the rotation rate of the meter roller 42 based on the speed of the air cart.

The meter roller 42 also includes protrusions, such as the illustrated flutes 46, and recesses 48. Each respective recess 48 is disposed between a respective pair of flutes 46. As the meter roller 42 rotates, the respective pair of flutes 46 moves the material 40 disposed within the respective recess 48 downwardly, thereby transferring the material 40 to the conduit 36. The number and geometry of the flutes 46 may be particularly configured to accommodate the material 40 being distributed. Certain meter rollers 42 may include six flutes 46 and a corresponding number of recesses 48. Alternative meter rollers may include more or fewer flutes 46 and/or recesses 48. For example, the meter roller 42 may include 2, 4, 6, 8, 10, 12, 14, 16, 18, 20, or more flutes 46 and/or recesses 48. In addition, the depth of the recesses 48 and/or the height of the flutes 46 are configured to accommodate the material 40 within the storage tank 26. For example, a meter roller having deeper recesses 48 and fewer flutes 46 may be employed for larger seeds, while a meter roller having shallower recesses 48 and more flutes 46 may be employed for smaller seeds. Other parameters such as flute pitch (e.g., angle of the flute relative to a longitudinal/rotational axis) and flute angle (e.g., angle of the flute relative to a radial axis) may also be particularly selected to accommodate the material 40. While the illustrated meter roller 42 includes flutes, it should be appreciated that in alternative embodiments, the meter roller may include other protrusions and/or the recesses may be omitted.

Each meter roller 42 may be configured to distribute a volume of the material 40 per revolution of the meter roller 42, and the volume may be based on the geometry of the meter roller 42 (e.g., a sum of respective volumes of the recesses 48). Thus, the rotation rate of the meter roller 42 controls a flow rate (e.g., volumetric flow rate) of the material 40 into the air stream 38. For example, as the meter roller 42 rotates, the meter roller 42 transfers the material 40 through an opening 50 in the agricultural material meter 25 into the respective conduit 36 (e.g., into a conduit associated with a respective row unit or group of row units). The material 40 then mixes with the air stream 38 from the air source 32, thereby forming an air/material mixture 52. The mixture 52 then flows to the respective row unit(s) of the implement via pneumatic conduits, where the seeds and/or fertilizer are deposited within the soil.

In operation, the operator may set a target distribution rate for the material 40 during a seeding operation. For example, the operator may set the target distribution rate to be a particular weight of the material 40 per unit area of the agricultural field (e.g., lbs. per acre). Because the meter roller 42 distributes the volume of the material 40 per revolution of the meter roller 42 and the target distribution rate is set to be the particular weight of the material 40 per unit area of the agricultural field, a calibration is carried out for the meter roller 42. Without the disclosed embodiments, an initial calibration (e.g., prior to the seeding operation) may include rotating the meter roller 42 a known number of revolutions, collecting the material 40 dispensed by the meter roller 42, and weighing the material 40 dispensed by the meter roller 42. Without the disclosed embodiments, this may include one or more steps that involve the operator (e.g., operator inputs at a user interface; operator handling of the material 40 dispensed by the meter roller 42 in order to weight the material 40). However, the disclosed embodiments enable the initial calibration to be completed in an automated and more efficient manner (e.g., without such separate calibration steps, such as without dispensing and weighing a portion of the material).

In particular, the disclosed embodiments include calculation of a density of the material 40 within the storage tank 26. The density of the material 40 within the storage tank 26 may be calculated using a weight measured by a scale 54 and a level measured by a level sensor 56. It should be appreciated the scale 54 may have any suitable position and/or functionality. For example, although the scale 54 is depicted at the bottom of the storage tank 26, the scale 54 may be disposed in other locations along the air cart 12, including on the frame of the air cart 12, along the suspension of the air cart 12, inside the storage tank 26, or any other suitable location in the air cart 12. Further, any number of scales 54 may be utilized, including 1, 2, 3, 4, 5, 6, or more. Further, the scale 54 may include any device capable of measuring the weight of the material 40 within the storage tank 26.

It should be appreciated the level sensor 56 may have any suitable position and/or functionality. For example, although the level sensor 56 is depicted at an upper portion of the storage tank 26, the level sensor 56 may be disposed in other locations within the storage tank 26. Further, any number of level sensors 56 may be utilized, including 1, 2, 3, 4, 5, 6, or more. Further, the level sensor 56 may include any device capable of measuring the level of the material 40 within the storage tank 26. As an example, the level sensor 56 may be an optical sensor (e.g., laser sensor) or an acoustic sensor (e.g., ultrasonic sensor) that obtains data indicative of a profile of an upper surface 58 of the material 40 in the storage tank 26. Then, a volume of the material 40 may be calculated using a known geometry of the storage tank 26 and the profile of the upper surface 58 of the material 40 in the storage tank 26. In some embodiments, the upper surface 58 of the material 40 in the storage tank 26 may be leveled (e.g., via vibration or other movement induced at the storage tank 26) and/or via a leveling device that sweeps across the upper surface 58 of the material 40. In such cases, the profile of the upper surface 58 of the material 40 in the storage tank 26 may be substantially flat and/or level to facilitate determination of a level (e.g., depth) of the material 40 in the storage tank 26 and the calculation of the volume of the material 40. In some embodiments, the level sensor 56 may obtain a limited number (e.g., 1, 2, 3, 4, 5, or 6) of data point(s) that indicate the level at a center (e.g., center portion) and/or at an edge (e.g., edge portion) of the upper surface 58 of the material 40 in the storage tank 26, rather than numerous data points across the upper surface 58 of the material 40 in the storage tank 26. It should be appreciated that one or more algorithms, models (e.g., computer models), and/or look up tables may be accessed and utilized to determine the volume of the material 40 in the storage tank 26 from the known geometry of the storage tank 26 and the data point(s) that indicate the level of the material 40 in the storage tank 26.

Regardless of the technique utilized to calculate the weight and the volume of the material 40, the density of the material 40 may be calculated based on the weight of the material 40 and the volume of the material 40. In particular, a controller (e.g., electronic controller) having a processor and a memory device may receive measurements indicative of the weight from the scale 54, measurements indicative of the level (and the volume) from the level sensor 56, and then calculate the density based on the weight and the volume (e.g., weight, or mass, per volume). The controller may then use the density to determine the weight of material 40 distributed per revolution(s) of the agricultural material meter 25 to thereby efficiently carry out the initial calibration for the agricultural material meter 25. Furthermore, the controller may use the density and/or the initial calibration to determine one or more parameters (e.g., fan speed) for the air source 32. The initial calibration and the one or more parameters for the air source 32 may enable the air cart 12 to efficiently and accurately provide the material 40 to the agricultural implement at the target distribution rate as the air cart 12 travels with the agricultural implement across the agricultural field, for example.

In the illustrated embodiment, the meter roller 42 is oriented substantially parallel to the direction of travel 13 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 13). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

Figure 3:
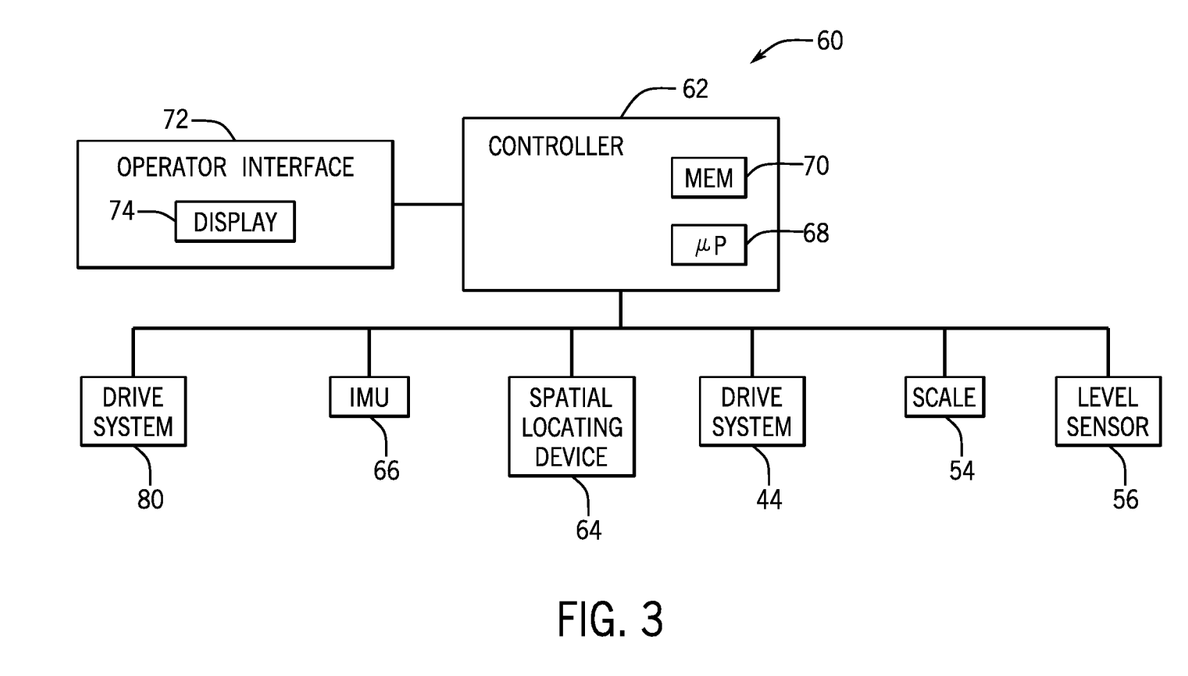
FIG. 3 of a block diagram of an embodiment of a control system for controlling a flow of particulate material through a metering system, such as the metering system of FIG. 2.

FIG. 3 is a block diagram of an embodiment of a control system 60 for controlling the flow of the material through the agricultural material meter. In the present embodiment, the control system 60 includes a controller 62 that is in communication with a spatial locating device 64 (e.g., global positioning system (GPS), speedometer, or odometer), an inertial measurement unit (IMU) 66 (e.g., accelerometer, gyroscope, or both), the drive system 44, the scale 54, the level sensor 56, a processor 68, a memory device 70, and an operator interface 72 that includes a display 74 (e.g., display screen, which may be a touchscreen display). It should be appreciated that these components are merely and that the controller 62 may be in communication with additional or alternative components. Furthermore, one or more of these components may be omitted.

The spatial locating device 64 may include one or more spatial locating antennas. Each spatial locating antenna is configured to receive spatial locating signals (e.g., GPS signals from GPS satellites) and to output corresponding spatial locating data to the spatial locating device 64. The spatial locating device 64 is configured to determine the position of each spatial locating antenna (e.g., based at least in part on the spatial locating signals). The spatial locating device 64 and/or the controller 62 is configured to determine the orientation of the agricultural material application system based at least in part on the position of each spatial locating antenna. Increasing the lateral separation distance between the spatial locating antennas may increase the accuracy of the vehicle orientation determination.

In certain embodiments, the control system 60 also includes the IMU 66 communicatively coupled to the controller 62 and configured to enhance the accuracy of the determined position and/or orientation. For example, the IMU 66 may include one or more accelerometers configured to output signal(s) indicative of acceleration along the longitudinal axis, the lateral axis, the vertical axis, or a combination thereof. In addition, the IMU 66 may include one or more gyroscopes configured to output signal(s) indicative of rotation (e.g., rotational angle, rotational velocity, rotational acceleration) about the longitudinal axis, the lateral axis, the vertical axis, or a combination thereof. The controller 62 may determine the position and/or orientation of the agricultural vehicle(s) based on the IMU 66 signal(s) while the spatial locating signals received by the spatial locating antennas are insufficient to facilitate position determination (e.g., while an obstruction, such as a tree or building, blocks the spatial locating signals from reaching the spatial locating antennas). In addition, the controller 62 may utilize the IMU 66 signal(s) to enhance the accuracy of the determined position and/or orientation. For example, the controller 62 may combine the IMU 66 signal(s) with the spatial locating data and/or the position determined by the spatial locating device 64 (e.g., via Kalman filtering, least squares fitting) to determine a more accurate position and/or orientation of the agricultural vehicle (e.g., by compensating for movement of the spatial locating antennas resulting from pitch and/or roll of the agricultural vehicle as the agricultural vehicle traverses uneven terrain).

The operator interface 72 is configured to present data to an operator (e.g., data associated with operation of the agricultural material application system). The operator interface 72 is also configured to enable an operator to control certain functions of the agricultural material application system (e.g., starting and stopping the agricultural material application system, adjusting the speed of the drive system 44). In the illustrated embodiment, the operator interface 72 includes the display 74 that is configured to present information to the operator, such as the position of the agricultural material application system within the agricultural field, the speed of the agricultural product application system, the path of the agricultural product application system, the weight of the material in the storage tank, the volume of the material in the storage tank, the density of the material in the storage tank, the seeding rate, the area seeded by the agricultural material application system, among other data.

Before the agricultural material application system disperses the material in the agricultural field, the initial calibration of the drive system 44 is set. In order to carry out the initial calibration, the controller 62 may receive inputs indicative of the weight of the material in the storage tank from the scale 54 and inputs indicative of the level of the material in the storage tank from the level sensor 56. The controller 62 may calculate the volume of the material in the storage tank using the known geometry of the storage tank and the inputs indicative of the level of the material in the storage tank. The controller 62 may then calculate the density of the material in the storage tank based on the weight and the volume. The controller 62 may then use the density to calculate a weight of the material distributed per revolution(s) of the agricultural material meter for the initial calibration (e.g., set an initial calibration number, such as 1, 2, 3, 4, and so on, which relates to the weight dispensed per rotation of the meter roller).

The controller 62 may also receive a variety of other information, such as the target application rate (e.g., weight per unit of land area, such as lbs. per acre) input by the operator (e.g., via the operator interface 72), signals indicative of travel (e.g., signals indicative of desired and/or current ground speed from the spatial locating device 64 and/or the IMU 66), and/or characteristics of the agricultural implement (e.g., a number of row units and/or a width of the agricultural implement). The controller 62 may use the other information in combination with the initial calibration to set an initial speed for the drive system 44 to drive the agricultural material meter to meter the material to achieve the target application rate as the agricultural implement travels through the agricultural field.

In some embodiments, the density is utilized to set the initial calibration and the initial calibration may be updated (e.g., refined) to an updated calibration as the agricultural implement travels through the agricultural field based on changes in the weight of the material in the storage tank per swept area of the agricultural field. If the weight of the material deposited per swept area is outside of a threshold value, the controller 62 or the operator may provide the updated calibration, which may update the meter roller rotation rate to bring the weight of the material deposited per swept area closer to a target value. The threshold value may be measured as a percent difference from the target value and could include a value of 5 percent, 7 percent, 10 percent, 15 percent, or any other percentage.

The controller 62 may also use the density and/or the initial calibration to set one or more parameters (e.g., fan speed) for a drive system 80 (e.g., motor) of the air source. For example, it may be desirable to provide a lower fan speed (and corresponding lower air flow) for a less dense material and to provide a higher fan speed (and corresponding higher air flow) for a more dense material. The lower fan speed for the less dense material may appropriately place the material in the trench in the soil, while the higher fan speed for the less dense material may cause the material to bounce out of the trench in the soil and reduce yield, for example. Similarly, the higher fan speed for the more dense material may distribute the material through the conduits/hoses without plugs, while the lower fan speed for the more dense material may cause the material to form plugs within the conduits/hoses and reduce yield, for example.

Thus, the controller 62 may utilize one or more algorithms and/or look up tables to determine an initial fan speed (e.g., rotation rate; initial fan speed) for the drive system 80 of the air source based on the density of the material. The controller 62 may also utilize the initial calibration (e.g., the calibration number) to determine the initial fan speed and/or the updated calibration to determine an updated fan speed as the agricultural implement travels through the agricultural field. Furthermore, the controller 62 may also access and utilize fan speed curves that relate the fan speed to the ground speed of the agricultural implement to determine the initial fan speed and/or the updated fan speed as the agricultural implement travels through the field.

As shown, the controller 62 may include the processor 68 and the memory device 70. The processor 68 and memory device 70 may be part of the controller 62, or may be separate from the controller 62. Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) processors. The controller 62 may include the memory device 70 that may store information such as control software, look up tables, configuration data, etc.

The memory device 70 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory device 70 may store a variety of information, which may be suitable for various purposes. For example, the memory device 70 may store machine-readable and/or processor-executable instructions (e.g., firmware or software) for the processor execution.

Figure 4:
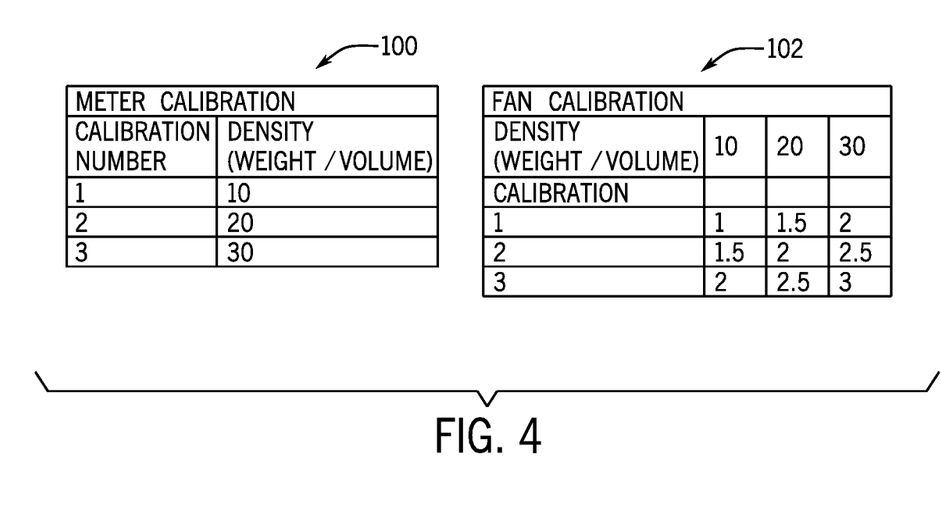
FIG. 4 is an embodiment of look up tables that may be utilized to facilitate efficient calibration of a metering system, such as the metering system of FIG. 2.

FIG. 4 illustrates an example of a first look up table 100 that relates calibration numbers to density and an example of a second look up table 102 that relates fan speed to calibration numbers and density. It should be appreciated that the first look up table 100 and the second look up table 102 are generally simplified examples that are provided to facilitate discussion. To the extent that look up tables are utilized by the controller, the look up tables may include many more entries (e.g., rows and/or columns) to provide many more operational settings. Furthermore, it should be appreciated that one or more algorithms may be utilized in addition to or instead of look up tables in order to carry out the techniques disclosed herein.

With the foregoing in mind, in operation, the operator may set the target application rate (e.g., lbs. per acre) for the seeding operation. Then, the controller may receive signals indicative of the weight of the material in the storage tank and the level of the material in the storage tank. The controller may access the known volume of the storage tank (e.g., from the memory device) and may calculate the volume of the material in the storage tank based on the level of the material in the storage tank that the known volume of the storage tank. Then, the controller may determine the density of the material in the storage tank based on the weight and the volume of the material in the storage tank.

Next, the controller may reference the first look up table 100 to calibrate the agricultural material meter (e.g., to select the calibration number that relates the weight of the material dispensed per revolution of the meter roller). Then, the controller may reference the second look up table 102 to set the fan speed for the air source. For example, the fan speed may be set to a first lower fan speed value (e.g., 1) when the calibration number is a first calibration number value (e.g., 1) and the density is relatively low (e.g., 10), and the fan speed may be set to a second higher fan speed value (e.g., 3) when the calibration number is the first calibration number value and the density is relatively high (e.g., 30). The controller may also then take into account the ground speed of the agricultural implement to further adjust the fan speed based on the ground speed (e.g., adjust up or down based on the ground speed) so as to maintain and/or block interference with the target application rate.

It should be appreciated that other operations and related techniques may be carried out in conjunction with the disclosed embodiments. For example, a volume of the material in the storage tank may additionally or alternatively be measured prior to loading the material into the storage tank (e.g., while the material is in another storage bin on a truck or other location and/or as the material is being transferred to the storage tank of the air cart via a conveyor, blower, or auger). The volume of the material measured in this way may be used to determine the density of the material in the storage tank alone or in combination with the volume of the material measured based on the known geometry of the storage tank and the weight of the material in the storage tank (e.g., via averaging of the two or more different volume measurements). The volume of the material measured in this way may also be used to verify and or to confirm that the volume of the material measured based on the known geometry of the storage tank and the weight of the material in the storage tank is accurate. For example, if the two or more different volumes are within a threshold percentage of one another (e.g., within 1, 2, 3, 4, or 5 percent) of one another, then the controller may confirm that the volume of the material is accurate and may proceed to calculate the density of the material. However, if the two or more different volumes are within a threshold percentage of one another, then the controller may provide an alert to the operator (e.g., via the user interface) and/or automatically initiate a second measurement process and/or automatically initiate a leveling process to facilitate a more accurate second measurement process.

Furthermore, the density of the material in the storage tank may be used to adjust operation of an agitator in the storage tank. For example, the controller may control the agitator to move (e.g., rotate) at a first lower rate while the density is relatively low, and the controller may control the agitator to move at a second higher rate while the density is relatively high to move the material within the storage tank (e.g., to facilitate flow toward the meter roller). In some embodiments, the density of the material in the storage tank may be used to estimate deformation of the storage tank and associated weight inaccuracies (e.g., as measured by the scale, due to the deformation). The controller may utilize one or more algorithms, models, or the like to adjust the weight as measured by the scale based on the density. For example, the controller may automatically adjust the weight by a percentage (e.g., five percent) based on a weight measurement and a density of the material in the storage tank.

It should be appreciated that a storage tank volume calibration step may be carried out prior to the seeding operation (e.g., at manufacturing or at any other time). For example, the controller may enter a volume calibration mode in which a sample of material with a known density is placed into the storage tank (e.g., to fill the storage tank or fill it up to a particular level). Then, the scale may measure the weight of the sample of the material in the storage tank, and the controller may determine the volume of the storage tank (or the portion of the storage tank up to the particular level) based on the density and the weight and use this information to increase the accuracy of future volume measurements.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for controlling a material flow rate from a metering system of an agricultural system, the method comprising:
receiving, at a controller, a weight of a material in a storage tank;
receiving, at the controller, a volume of the material in the storage tank;
determining, via the controller, a density of the material in the storage tank using the weight of the material in the storage tank and the volume of the material in the storage tank; and
determining, via the controller, a calibration of the metering system based on the density of the material in the storage tank.

2. The method of claim 1, comprising receiving, at the controller, a signal indicative of the weight from a weight sensor of the agricultural system.

3. The method of claim 1, comprising:
receiving, at the controller, a level signal indicative of a level of the material in the storage tank; and
determining, via the controller, the volume of the material in the storage tank using a known geometry of the storage tank and the level of the material in the storage tank.

4. The method of claim 3, comprising receiving, at the controller, the level signal from a level sensor coupled to the storage tank.

5. The method of claim 4, wherein the level sensor comprises an optical sensor or an acoustic sensor.

6. The method of claim 4, wherein the level signal is indicative of a profile of an upper surface of the material in the storage tank.

7. The method of claim 1, comprising controlling, via the controller, a metering rate of the metering system based on the calibration to control the material flow rate of the material from the storage tank to a field as the agricultural system travels through the field.

8. The method of claim 1, comprising controlling, via the controller, a fan speed of an air source based on the density of the material in the storage tank to provide an air flow to transfer the material dispensed from the metering system through a conduit to a seeding implement of the agricultural system.

9. The method of claim 1, comprising updating, via the controller, the calibration to generate an updated calibration based on changes in the weight of the material in the storage tank per swept area as the agricultural system having the storage tank travels through a field.

10. The method of claim 1, comprising:
accessing, at the controller, a metered volume of the material distributed per revolution of a rotating component of the metering system; and
calculate, at the controller, a metered weight of the material distributed per revolution of the rotating component of the metering system based on the metered volume and the density;
wherein determining, via the controller, the calibration of the metering system based on the density of the material in the storage tank comprises determining, via the controller and prior to distribution of the material from the storage tank to a field with the metering system, the calibration as an initial calibration based on the metered weight of the material distributed per revolution of the rotating component of the metering system.

11. The method of claim 10, comprising:
receiving, at the controller, a target application rate of weight per unit of land area for the field; and
controlling, via the controller, a rotational rate of the rotating component of the metering system based on the initial calibration to control the material flow rate of the material from the storage tank to the field to achieve the target application rate as the agricultural system travels through the field.

12. The method of claim 1, comprising determining, via the controller and prior to distribution of the material from the storage tank to a field with the metering system, the calibration as an initial calibration of the metering system without dispensing a portion of the material in the storage tank.

13. The method of claim 1, comprising:
receiving, at the controller, additional information comprising a target application rate of the material per unit of land area, a ground speed of the agricultural system, and characteristics of the agricultural system; and
setting, via the controller, an initial speed of the metering system based on the calibration and the additional information as the agricultural system travels through a field.

14. A controller comprising a memory and a processor, wherein the controller is configured to:
access a weight of a material in a storage tank;
access a volume of the material in the storage tank;
determine a density of the material in the storage tank using the weight of the material in the storage tank and the volume of the material in the storage tank;
determine a calibration of a metering system based on the density of the material in the storage tank;
control the metering system based on the calibration to dispense the material from the storage tank to a conduit; and
control a fan speed of an air source based on the density of the material in the storage tank to provide an air flow to transfer the material dispensed from the metering system through the conduit to a seeding implement of an agricultural system.

15. The controller of claim 14, wherein the controller is configured to receive a weight signal indicative of the weight of the material in the storage tank from a weight sensor.

16. The controller of claim 14, wherein the controller is configured to:
receive a level signal indicative of a level of the material in the storage tank from a level sensor; and
determine the volume of the material in the storage tank using a known geometry of the storage tank and the level of the material in the storage tank.

17. An agricultural system, comprising:
a storage tank configured to store a material;
a metering system configured to meter the material from the storage tank; and
a controller comprising a memory and a processor, wherein the controller is configured to:
determine a density of the material in the storage tank using a weight of the material in the storage tank and a volume of the material in the storage tank; and
determine a calibration of the metering system based on the density of the material in the storage tank.

18. The agricultural system of claim 17, comprising:
a weight sensor configured to measure the weight of the material in the storage tank; and
a level sensor configured to measure a level of the material in the storage tank, wherein the controller is configured to determine the volume of the material in the storage tank based on the level of the material in the storage tank and a known geometry of the storage tank.

19. The agricultural system of claim 17, wherein the calibration relates to a metered weight of the material dispensed per rotation of the metering system, and the controller is configured to control a rotation rate of the metering system based on the calibration to control a flow rate of the material.

20. The agricultural system of claim 17, comprising an air source that is configured to provide an air flow to facilitate transfer of the material dispensed from the metering system through a conduit to a seeding implement of the agricultural system, wherein the controller is configured to control the air source to adjust a rate of the air flow based on the density of the material in the storage tank.

* * * * *